United States Patent [19]

Urban

[11] 3,904,743

[45] *Sept. 9, 1975

[54] CONTINUOUS PROCESS FOR SCRUBBING SO₂ FROM A GAS STREAM AND MAKING SULFUR

[75] Inventor: Peter Urban, Northbrook, Ill.

[73] Assignee: Universal Oil Products Company, Des Plaines, Ill.

[ * ] Notice: The portion of the term of this patent subsequent to Jan. 30, 1990, has been disclaimed.

[22] Filed: June 18, 1973

[21] Appl. No.: 371,199

Related U.S. Application Data

[63] Continuation-in-part of Ser. No. 156,183, June 24, 1971, Pat. No. 3,764,653, which is a continuation-in-part of Ser. No. 68,274, Aug. 31, 1970, Pat. No. 3,635,820.

[52] U.S. Cl.............................. 423/567; 423/242
[51] Int. Cl............................................ C01b 17/02
[58] Field of Search ............ 423/242, 514, 571, 567

[56] References Cited
UNITED STATES PATENTS

| | | | |
|---|---|---|---|
| 2,729,543 | 1/1956 | Keller | 423/242 X |
| 3,714,338 | 1/1973 | Urban | 423/571 |

*Primary Examiner*—G. O. Peters
*Attorney, Agent, or Firm*—James R. Hoatson, Jr.; Thomas K. McBride; William H. Page, II

[57] ABSTRACT

An input gas stream containing $SO_2$ is continuously treated in order to remove a substantial portion of the $SO_2$ therefrom and to produce elemental sulfur by the steps of:

(a) scrubbing the input gas stream with an aqueous absorbent containing an alkaline reagent; (b) treating at least a portion of the resulting rich absorbent stream with a first reducing agent at conditions selected to convert the sulfite compound contained therein to the corresponding thiosulfate compound; (c) reacting the resulting thiosulfate compound with a mixture of a water-soluble sulfide compound and a second reducing agent at reduction conditions selected to produce an effluent stream containing a polysulfide compound; (d) subjecting at least a portion of the resulting effluent stream to polysulfide decomposition conditions effective to form elemental sulfur, an $H_2S$-containing overhead stream and a regenerated aqueous absorbent stream; and, thereafter, (e) passing at least a portion of the regenerated absorbent stream to the $SO_2$-scrubbing step. The principal utility of this scrubbing process is associated with the problem of continuously removing a sulfur dioxide contaminant from the flue or stack gas streams such as are typically produced in modern electrical power generating stations in order to abate a serious pollution problem and to enable the safe, nonpolluting combustion of high sulfur fuels.

19 Claims, 1 Drawing Figure

CONTINUOUS PROCESS FOR SCRUBBING SO₂ FROM A GAS STREAM AND MAKING SULFUR

CROSS-REFERENCES TO RELATED APPLICATIONS

Figure 1:
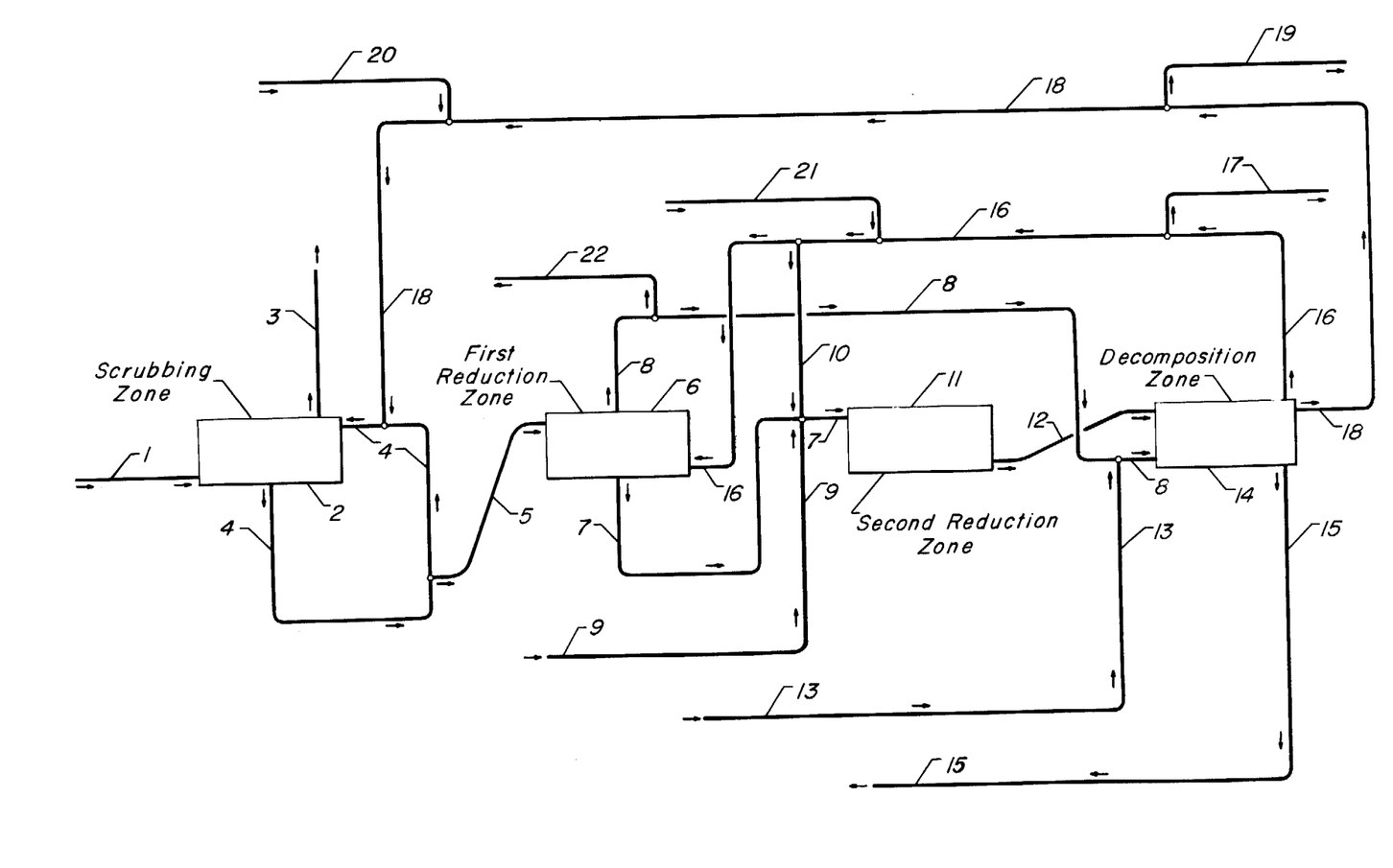

This application is a continuation-in-part of my prior, copending application Ser. No. 156,183, filed June 24, 1971 now U.S. Pat. No. 3,764,653 which in turn is a continuation-in-part of my application Ser. No. 68,274 filed Aug. 31, 1970 and issued as U.S. Pat. No. 3,635,820 on Jan. 18, 1972.

The subject of the present invention is a novel, continuous process for the selective removal of $SO_2$ from a gas stream containing same. More precisely, the present invention involves an $SO_2$-scrubbing step operated with an aqueous absorbent containing an alkaline reagent coupled with a unique regeneration procedure which comprises: a preliminary treatment step wherein sulfite compounds contained in the rich scrubbing solution are converted to the corresponding thiosulfate compounds, a primary reduction step wherein the resulting thiosulfate compounds are converted to the corresponding polysulfide compound, and a polysulfide decomposition step wherein the absorbent solution is regenerated with liberation of a hydrogen sulfide-containing overhead stream and elemental sulfur. In one important aspect, the present invention has to do with a $SO_2$-scrubbing process which is operated with highly efficient aqueous absorbent comprising sodium hydroxide, sulfite, bicarbonate, or carbonate wherein the rich scrubbing solution withdrawn from the scrubbing step contained sodium sulfite and/or sodium bisulfite, wherein the preliminary treatment step involves selective conversion of the sodium sulfite and/or sodium bisulfite to sodium thiosulfate, wherein the primary reduction step involves selective conversion of sodium thiosulfate to sodium polysulfide and wherein $H_2S$ is stripped from the resulting polysulfide-containing solution with $CO_2$ to liberate elemental sulfur and to form the regenerated absorbent.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc., to produce flue or stack gas streams containing significant amounts of sulfur dioxide. Similarly, waste gas streams of this type are generally produced by other industrial processes such as the smelting of sulfur-bearing ores, the refining of coke, the production of sulfur in a Claus process, the production of sulfuric acid, the sulfonation of organic materials, the production of sulfurcontaining fertilizers, the production of paper via a wood pulping process and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A large percentage of these proposed removal procedures involve contacting the sulfur dioxide containing gas stream with an aqueous absorbent stream which typically contain materials which chemically or physically react with the sulfur dioxide in order to absorb same into the liquid solution. A widely studied procedure involves the use of a solution of an alkaline reagent such as ammonium hydroxide, sulfite, or carbonate, one of the alkali or alkaline earth metal salts such as sodium hydroxide, sulfite, or carbonate, potassium hydroxide, sulfite or carbonate and the like alkaline reagents, to produce a rich absorbent stream containing the corresponding sulfite and/or bisulfite compound. For example, the use of an aqueous absorbent containing sodium bicarbonate and carbonate to form a rich scrubbing solution containing sodium sulfite and bisulfite.

Although the simple concept of the scrubbing $SO_2$ from the gas stream containing same with an aqueous absorbent containing an alkaline reagent has many advantages associated with it such as simplicity, high effectiveness and versatility, wide spread adoption of this type of solution to the $SO_2$ pollution problem has been inhibited by the lack of a regeneration procedure for the rich absorbent stream which can continuously regenerate the rich absorbent stream by selectively and economically converting the absorbed $SO_2$ to a conveniently handled and saleable product in a highly selected manner. That is, it is required that the regeneration procedure enable the operation of the scrubbing system in a closed-loop scrubber with respect to the absorbent. In particular, it is required that an acceptable regeneration procedure have the capability of not only continuously producing a regenerated absorbent stream but also minimizing undesired by-poducts so as to prevent the buildup of undesired intractable, difficultly removed ingredients in the absorbent stream once the system is operated in a closed-loop fashion. The by-product that is of the greatest concern in this regard is sulfate — for example, in a system using an aqueous solution of sodium hydroxide or sodium carbonate as the absorbent, sodium sulfate and bisulfate salts once formed in the system can present serious problems if special means are not provided to remove it or its production is not controlled and suppressed. Specifically these salts can build up until finely divided solids are formed which then can cause corrosion, erosion and fouling problems.

One solution that has been proposed to the problem of regenerating the rich absorbent streams of the types discussed above is the use of the suitable reducing agent to react with the sulfite compounds contained therein in order to selectively produce elemental sulfur and/or the corresponding sulfide compound. However, despite stringent precautions, when common reducing agents such as hydrogen, a suitable sulfide compound, or carbon monoxide are used in an attempt to directly reduce these sulfite compounds to elemental sulfur or the corresponding sulfide compounds, undesired sulfate compounds are formed in unacceptable amounts. These sulfate compounds are believed to be caused by the sulfite compounds undergoing auto-oxidation-reduction at the conditions necessary for direct reduction.

The problem addressed by the present invention is, therefore, to provide a flue gas scrubbing system which is capable of continuous operation with a closed-loop absorbent circuit, which can selectively produce an easily removed substance as the principal product of the regeneration section and which can minimize the amount of undesired sulfate by-products formed in the regeneration section.

I have now found a combination process for continuously scrubbing $SO_2$ from a gas stream which utilizes a conventional aqueous absorbent stream in a closed-loop fashion and comprising a wet scrubbing step coupled with a novel regeneration procedure which enables the recovery of elemental sulfur in high yield, minimizes undesired sulfate by-products from the regeneration section and produces a regenerated absorbent stream which is of a relatively low total sulfur content, and, consequently, possesses a high capacity for $SO_2$ removal. The concept of the present invention is based on my finding that the sulfite compound contained in the rich scrubbing solution withdrawn from the $SO_2$-scrubbing step can be easily converted with a first reducing agent at relatively low severity conditions to the corresponding thiosulfate compound in a highly selective manner without forming any substantial amounts of undesired, intractable sulfate compounds. Coupled with the finding is my additional observation that the thiosulfate compound can be reduced by a mixture of a water-soluble sulfide compound and a second reducing agent selected from the group consisting of hydrogen, carbon monoxide and mixtures thereof, in a highly selective, economic and efficient manner to form the corresponding polysulfide compound from which elemental sulfur and hydrogen sulfide can thereafter be easily recovered. Thus the central point of the present process involves using a conventional $SO_2$-scrubbing procedure coupled with a regeneration procedure wherein thiosulfate is used as an intermediate in a multistep operation designed to convert the sulfite compound contained in the rich absorbent stream to elemental sulfur, rather than an attempt to directly reduce the sulfite compound to sulfur or sulfide in a single step operation. This sulfite-to-thiosulfate-to-polysulfide-to-sulfur route provides a regeneration procedure which facilitates careful control of by-product formation during the regeneration operation and enables the production of a regenerated absorbent stream which can be directly recycled to the scrubbing step, thereby allowing the system to be operated in the closed loop fashion with respect to the absorbent stream.

Features of my process are: (1) the selective conversion in a preliminary treatment step of the sulfite compound formed in the scrubbing step to the corresponding thiosulfate compound at relatively mild conditions by means of a first reducing agent selected from the group consisting of finely divided sulfur, a polysulfide compound, a watersoluble sulfide compound and mixtures thereof; (2) the subsequent selective reduction in a primary reduction step of the resulting thiosulfate-containing aqueous solution at relatively more severe conditions to yield the corresponding polysulfide compound; (3) the efficient decomposition of the resulting polysulfide compound to yield elemental sulfur, hydrogen sulfide and a regenerated absorbent stream; (4) use in the primary reduction step of a mixture of a water-soluble sulfide and a second reducing agent selected from the group consisting of hydrogen, carbon monoxide and mixtures thereof, in order to enable the selective production of a relatively rich polysulfide stream with a relatively inexpensive reducing agent; and (5) minimization of undesired intractable sulfate by-products in each of the steps of the regeneration section of the process. It is to be noted that a key feature of my process is the addition of a sulfide reactant to the primary reduction step; this is in accordance with my finding that its presence enables the selective production of a product stream rich in polysulfide in this step instead of sulfide-rich product stream. This capability to form polysulfide in the primary reduction step in turn leads to the production of elemental sulfur, which is the most desired product of a sulfur recovery scheme.

It is accordingly, an object of the present invention to provide a simple, effective, efficient, and selective procedure for treating a gas stream containing $SO_2$ which process can selectively produce elemental sulfur and operate with a continuous closed-loop circuit of absorbent between the scrubbing section and the regeneration section. Another object is to minimize the amount of undesired, intractable sulfate-by-products formed in the regeneration section of such a procedure. Another object is to provide a regeneration procedure for an $SO_2$-scrubbing step that maximizes the sulfur differential across the regeneration procedure, thereby increasing the capacity and efficiency of the regenerated absorbent.

In brief summary, one embodiment of the present invention is a process for treating an input gas stream containing $SO_2$ in order to continuously remove a substantial portion of the $SO_2$ therefrom and to produce elemental sulfur. The first step is a scrubbing step wherein the input gas stream is contacted in a suitable liquid-gas contacting zone with an aqueous absorbent containing an alkaline reagent at scrubbing conditions selected to result in a treated gas stream containing a substantially reduced amount of $SO_2$ and in an effluent water stream containing a water-soluble sulfite compound. The next step is a preliminary treatment step which involves contacting at least a portion of the effluent stream from the scrubbing step with a first reducing agent, selected from the group consisting of finely divided sulfur, a polysulfide compound, a water-soluble sulfide compound and mixtures thereof, at thiosulfate production conditions selected to form an effluent stream containing a thiosulfate compound. Thereafter, the effluent stream from the preliminary treatment step is reacted with a water-soluble sulfide compound and a second reducing agent, selected from the group consisting of carbon monoxide, hydrogen and mixtures thereof, in a primary reduction step at reduction conditions selected to produce a polysulfidecontaining aqueous effluent stream. The next step is a polysulfide decomposition step wherein hydrogen sulfide is stripped from at least a portion of the aqueous effluent stream from the primary reduction step to produce a hydrogen sulfide-containing overhead stream, elemental sulfur and a regenerated aqueous absorbent stream. In the final step, at least a portion of the resulting regenerated aqueous absorbent stream is passed to the scrubbing step, thereby providing a closed-loop flow circuit of absorbent.

In another embodiment, the invention is a process as outlined about in the first embodiment wherein the alkaline reagent utilized in the aqueous absorbent stream is selected from the group consisting of the salts of ammonia, the alkali metals and the alkaline earth metals which hydrolize in water to form a solution which is sufficiently basic so that it has the capability to absorb $SO_2$ by forming sulfite or bisulfite salts — for example, the hydroxide, sulfite, bicarbonate, carbonate and the like salts.

In a more specific embodiment, the present invention is a process for treating a gas stream containing $SO_2$ in order to remove a substantial portion of the $SO_2$ therefrom. The first step in this embodiment involves a scrubbing step in which the input gas stream is contacted with an aqueous absorbent containing sodium carbonate or bicarbonate at scrubbing conditions selected to form a treated gas stream containing a substantially reduced amount of $SO_2$ and an effluent water stream containing sodium sulfite or bisulfite. At least a portion of the effluent water stream from the scrubbing step is thereafter contacted in a preliminary treatment step, with a first reducing agent, selected from the group consisting of finely divided sulfur, a polysulfide, a water-soluble sulfide compound and mixtures thereof, at thiosulfate production conditions selected to result in an effluent stream containing sodium thiosulfate. The primary reduction step then involves reacting the effluent stream from the preliminary treatment step with a water-soluble sulfide compound and a second reducing agent selected from the group consisting of carbon monoxide, hydrogen and mixtures thereof at reduction conditions selected to produce an aqueous effluent stream containing sodium polysulfide. At least a portion of the aqueous effluent stream from this primary reduction step is thereafter subjected to contact with a carbon dioxidecontaining stripping gas at polysulfide decomposition conditions effective to produce a regenerated aqueous absorbent stream containing sodium bicarbonate or carbonate, elemental sulfur and an overhead gaseous stream containing hydrogen sulfide. At least a portion of the resulting regenerated absorbent stream is then in the final step, passed to the scrubbing step, thereby providing a closed-loop flow circuit absorbent.

In another embodiment, the present invention is a process as described above in the last embodiment wherein the reducing agent utilized in the preliminary treatment step is hydrogen sulfide and wherein at least a portion of the overhead stream produced in the polysulfide decomposition step is passed to the preliminary treatment step in order to supply a portion of the hydrogen sulfide reactant utilized therein.

Yet another embodiment of the present invention involves a process as outlined above in the first embodiment wherein the primary reduction step is performed in the presence of a catalyst comprising a catalytically effective amount of a metallic component selected from the group consisting of the transition elements of Groups VI and VIII of the Periodic Table, and compounds thereof, combined with a porous carrier material.

Other objects and embodiments of the present invention are hereinafter disclosed in the following detailed discussion of the input streams, the preferred conditions, the preferred reactants, the output streams and mechanics associated with each of the essential and preferred steps of the present invention.

The starting point for the subject process is a scrubbing step wherein an input gas stream containing $SO_2$ is contacted in a suitable gas-liquid contacting means with an aqueous absorbent containing an alkaline reagent. As previously explained, the input gas stream passed to this step is typically a flue or stack gas. For example, a typical stack gas stream containing about 1 to about 10% $O_2$, about 5 to 15% or more $CO_2$, about 3 to about 10% or more $H_2O$, about 0.1 to about 1% or more $SO_2$. In many cases, the input gas stream will also contain carbon monoxide, oxide of nitrogen, entrained fly ash and the other well known ingredients for flue gas stream. The amount of $SO_2$ contained in this input gas stream can vary over a wide range; namely from about 0.01 to about 1 mole % or more, with a more typical amount being about 0.05 to about 0.5 mole %. In many cases, this input gas stream is available at a relatively high temperature of about 200° to about 500° F. or more, and since it is preferred that the temperature of the input gas stream be at a relatively low level because this increases the capacity of the absorbent solution, it is often advantageous to cool the input gas stream by any suitable means such as by presaturating it with water under adiabatic conditions.

The aqueous absorbent utilized in this scrubbing step is generally characterized as an aqueous solution of a suitable alkaline reagent which reacts with water to give a solution which can absorb $SO_2$ by forming sulfite or bisulfite salts such as ammonium hydroxide, sulfite, carbonate and bicarbonate, the alkali metal hydroxides, sulfites, carbonates and bicarbonates and the water-soluble alkaline earth metal hydroxide, carbonates, sulfites and bicarbonates, and the like alkaline reagents. Of the alkali metal reagents, sodium hydroxide, sodium carbonate, sodium sulfite, sodium bicarbonate, potassium hydroxide, potassium sulfite, potassium carbonate, potassium bicarbonate are particularly preferred. In most cases, excellent results are obtained when the alkaline reagent is sodium or ammonium hydroxide, carbonate or bicarbonate. It is to be noted that it is within the purview of the present invention to use a mixture of the alkaline reagents previously mentioned. Since it is also contemplated that the scrubbing step can be operated with the absorbent continuously cycling around the scrubbing means, it is possible that absorbent could accumulate substantial amounts of sulfite and bisulfite compounds. In this last case, only a small portion of the rich effluent stream from the scrubbing step would be sent to the regeneration section of the process, and the major portion of the rich absorbent would be commingled with the regenerated absorbent stream and recycled to the scrubbing step.

The amount of alkaline reagent contained in the scrubbing solution is subject to some choice depending upon the specific requirements associated with the particular gas stream being treated; ordinarily, acceptable results are obtained when the alkaline reagent comprises about 1 to about 50 wt. % of the absorbent solution, and more preferably to 1 to about 15 wt. %. Of course, absorbent solutions containing an amount of the alkaline reagent up to the solubility limit of the particular alkaline reagent selected at the conditions maintained in the scrubbing step can be utilized if desired. In the case where the absorbent is continuously cycled around the scrubbing step and only a drag or slip stream drawn off for regeneration, the total amount of the alkaline reagent contained in the solution (i.e., fresh and spent) can reach rather high levels; for example, it can easily constitute 30 to 50 wt. % of the absorbent solutions.

This scrubbing step can be carried out in a conventional scrubbing zone in any suitable manner including multiple stages. The scrubbing solution can be passed into the scrubbing zone in either upward or downward flow and the input gas stream can be simultaneously introduced into the scrubbing zone in concurrent or countercurrent flow relative to the scrubbing solution. A particularly preferred procedure involves downward flow of the scrubbing solution with counter-current flow of the gas stream which is to be treated. Either a liquid-full or a gas-full mode of operation can be used in the scrubbing zone, with the latter mode generally being preferred because of pressure drop considerations. The scrubbing zone is preferably a conventional gas-liquid contacting zone containing suitable means for effecting intimate contact between a descending liquid stream and an ascending gas stream. Suitable contacting means include bubble trays, baffles, and any of the various packing materials known to those skilled in the art. In this countercurrent mode of operation, a treated gas stream is withdrawn from the upper region of the scrubbing zone and a rich absorbent solution is withdrawn from the lower region thereof. For the class of alkaline reagents of concern here, the rich absorbent solution will contain substantial amounts of a water-soluble sulfite compound such as ammonium sulfite and/or bisulfite, sodium sulfite and/or bisulfite and the like. As indicated previously, according to one mode of operation of the scrubbing step, only a drag stream from the rich absorbent withdrawn from the step is sent to the regeneration section of the process; the rest is cycled around the scrubbing step. The drag stream is ordinarily withdrawn at a rate at least sufficient to continuously remove the net sulfur taken up in the scrubbing step.

This scrubbing step is generally conducted under conventional scrubbing conditions which are selected on the basis of the characteristics of the specific alkaline reagent utilized, the sulfur dioxide content of the input gas stream, the portion of the sulfur dioxide that is to be removed in the scrubbing step, and the physical properties of the scrubbing zone. Ordinarily, the scrubbing step is preferably operated at a relatively low temperature of about 10° to 100° C., a relatively low pressure which typically approximates atmospheric, a volume ratio of input gas streams to scrubbing solution of about 100:1 to about 10,000:1 and a pH of about 4 to 7 or more. When the input gas stream is a flue or stack gas stream, means must ordinarily be provided for cooling the input gas stream to a relatively low temperature before it is introduced into the scrubbing step. Likewise, since the typical operation of the scrubbing step involves the handling of large volumes of gas containing only a relatively small amount of sulfur dioxide, it is preferred that the pressure drop through the scrubbing zone be held to a minimum so as to avoid the necessity of compressing large volumes of gas to overcome the pressure drop within the scrubbing zone.

Following the scrubbing step, the next step of the present process is the preliminary treatment step and it involves the conversion, in the highly selective manner, of the sulfite or bisulfite compound contained in at least a portion of the effluent water stream withdrawn from the scrubbing step, to the corresponding thiosulfate compound. Ordinarily the sulfite or bisulfite compound is contained in the feed stream to this step in an amount of about 0.01 wt. %, calculated on an equivalent sulfur basis, up to the solubility limit of the particular sulfite compound in water at the conditions utilized in the scrubbing step; for example, the feed stream to this step can contain about 1 to about 20 wt. % sulfur as ammonium sulfite and/or bisulfite. According to the present invention, this step involves a reaction between the sulfite compound contained in this rich absorbent stream and a special type of reducing agent. This first reducing agent is selected from the group consisting of finely divided sulfur, a polysulfide compound, a water-soluble sulfide compound and mixtures thereof. In the first mode of operation of this step, finely divided sulfur is utilized as the reducing agent, and it is preferred that the sulfur be present in particle size of about 10 to about 250 microns, with best results obtained with particles of about 25 to about 100 microns. Typically, it is a good practice to introduce the sulfur into this step via a water stream containing a slurry of finely divided sulfur in an amount of about 1 to about 75 wt. % thereof, although many other suitable means for injecting finely divided solid particles can be utilized if desired. In this first mode of operation, it is preferred to also utilize a wetting agent in the reaction mixture in order to facilitate good contact of the elemental sulfur with the sulfite compound. Suitable wetting agents are: the salts of alkyl aryl sulfonates such as the sodium salt of dodecylbenzene sulfonate; sulfonated fatty acid esters; $C_{12}$ to $C_{16}$ alkyl sulfates; $C_{12}$ to $C_{16}$ alkyl sulfonates; alkyl polyoxyethylene alcohols; ethylene oxide condensation products of alkyl phenols; quaternary ammonium salts such as octadecyldimethylbenzyl ammonium chloride and the like wetting agents. The wetting agents is preferably utilized in a relatively small amount corresponding to about 0.01 to about 1 wt. % of the sulfite compound that is reacted. The amount of elemental sulfur utilized in this first mode of operation of this step should be sufficient to supply 1 atom of sulfur per molecule of sulfite compound contained in the absorbent stream, with the preferred amount corresponding to about 1 to about 3 atoms of sulfur per mole of sulfite compound. A preferred source for the necessary sulfur reactant in this mode of operation is a portion of the sulfur product of the hereinafter described polysulfide decomposition step.

In a second mode of operation for this preliminary treatment step, the reducing agent is a polysulfide compound. Suitable polysulfide compounds include the ammonium, alkali metal, and alkaline earth polysulfides. Best results are ordinarily obtained with ammonium or sodium polysulfide. The polysulfide compound is ordinarily charged to this step in the form of an aqueous solution containing about 1 to about 50 wt. % of the polysulfide compound. It is to be noted that when the reducing agent is a polysulfide compound, no wetting agent is necessary in order to achieve good contact with the sulfite compound. The amount of the polysulfide compound charged to this step is preferably sufficient to provide at least the stoichiometric amount necessary for the reaction between it and the sulfite compound to produce the corresponding thiosulfate compound. In the typical case where the polysulfide compound contains four atoms of elemental sulfur and one atom of sulfide (e.g. $(NH_4)_2S_5$), the stoichiometric amount is 1/6 moles of polysulfide per mole of sulfite compound, with a preferred value being about one-fourth to about three-fourths or more moles of polysulfide per mole of sulfite compound. The preferred internal source for the polysulfide reactant in this mode of operation is a portion of the efficient stream from the primary reduction step.

In a third mode of operation of this preliminary treatment step, the reducing agent is a water-soluble sulfide compound. Suitable water-soluble sulfide compounds are hydrogen sulfide, ammonium sulfide, ammonium hydrosulfide and the sulfides and hydrosulfide salts of the alkali and alkaline earth metals. Best results are ordinarily obtained in this mode of operation of this step when the sulfide reactant is hydrogen sulfide or sodium or ammonium hydrosulfide. The amount of this sulfide reactant utilized in this step is at least sufficient to provide 0.5 moles of sulfide compound per mole of sulfite compound contained in the rich absorbent stream, with best results obtained at a mole ratio corresponding to about 0.6 to about 1.5 or more. Likewise, in this third mode of operation, good results are ordinarily obtained when the pH of the input water stream is in the range of 4 to about 7. A preferred internal source for the sulfide reactant in this third mode is a portion of the $H_2S$—containing overhead stream from the polysulfide decomposition step.

Conditions utilized in this preliminary treatment step can be generally described as thiosulfate production conditions and comprise: a temperature of about 20° to about 150° C. and preferably about 25° to 75° C.; a pressure sufficient to maintain the rich absorbent stream in the liquid phase and preferably about 25 to 300 psig.; and a contact time corresponding to about 0.05 to 1 or more hours. In general, the contact time necessary for the desired reaction is a function of the reducing agent utilized, with relatively short contact times of about 1 to 5 minutes being sufficient in the case where the reducing agent is a sulfide or a polysulfide compound. The other two reducing agents require a relatively longer contact time ranging up to about 0.1 to about 1 hour. Considering all of the factors involved in the operation of this preliminary treatment step, best results are ordinarily obtained when the reducing agent is hydrogen sulfide or a polysulfide compound, particularly sodium or ammonium polysulfide.

Following this preliminary treatment step, a substantially sulfite-free aqueous effluent stream containing relatively large amounts of the corresponding thiosulfate compound is withdrawn from this first step and passed to the primary reduction step of the present invention. This aqueous effluent stream may contain minor amounts of unreacted sulfite compound and unreacted first reducing agent and very minor amounts of undesired sulfate compound. Typically, with the first reducing agents and conditions mentioned above, greater than 90% of the sulfite present in the rich absorbent stream is converted to thiosulfate with less than 5% being converted to the undesired, intractable sulfate. In accordance with the present invention, this effluent stream is reacted, in the primary reduction step, with a mixture of a water-soluble sulfide compound and a second reducing agent. The second reducing agent is selected from the group consisting of carbon monoxide, hydrogen and mixtures thereof.

It is an essential feature of the present invention that a water-soluble sulfide compound is charged to this primary reduction step. This water-soluble sulfide compound is typically selected from the following group: hydrogen sulfide, ammonium sulfide, ammonium hydrosulfide and the sulfides and hydrosulfides of the alkali and alkaline earth metals. Best results are ordinarily obtained when this sulfide reactant is hydrogen sulfide or the sulfide salt corresponding to the alkaline reagent present in the input water stream. For example, when the input water stream contains ammonium sulfide, the preferred sulfide reactants are hydrogen sulfide and/or ammonium hydrosulfide. The sulfide reactant for use in this step may be derived from external or internal sources. Suitable external sources are $H_2S$ streams produced by scrubbing common $H_2S$-containing gas streams which are available in the petroleum refining industry, the steel industry and the like industrial sources of $H_2S$-contaminated gas streams. Yet another external source for the sulfide reactant are well known processes for converting elemental sulfur into $H_2S$ by reacting same with hydrogen, hydrocarbons or steam. After the instant process is started-up and lined-out, it is preferred that at least a portion of this sulfide reactant is obtained from an internal source; specifically, a portion of the sulfide compound produced in the subsequently described polysulfide decomposition step. In many cases it is a preferred mode of operation of the present process to derive essentially all of the sulfide reactant necessary for this primary reduction step from this polysulfide decomposition step. This sulfide reactant is charged to this step in an amount which is sufficient to result in a mole ratio of sulfide to second reducing agent of about 0.05:1 to about 1:1. In most cases when the sulfide reactant is completely furnished by recovery of the sulfide product of the decomposition step, this mole ratio will be in the range of about 0.1:1 to about 0.5:1. It is to be noted that my finding with regard to the amount of the sulfide reactant is that a minor amount of same will act to shift the selectivity of the products produced in this primary reduction step towards elemental sulfur bound up in polysulfide.

The other essential reactant for this primary reduction step is the second reducing agent which is selected from the group consisting of carbon monoxide, hydrogen and mixtures thereof. In the case where this reducing agent is hydrogen, it may be substantially pure hydrogen or a mixture of hydrogen with other relatively inert gases such as a mixture of hydrogen with $C_1$ to $C_4$ hydrocarbons, a mixture of hydrogen and nitrogen and the like mixtures. The excess recycle gas from various petroleum processes which have a net hydrogen make such as a reforming process, dehydrogenation process and the like may be utilized as desired. Likewise, a hydrogen stream suitable for use here may be derived from a catalytic steam reforming process with an attendant shift conversion operation, from partial oxidation of liquid hydrocarbons, from gasification of solid carbonaceous material and from electrolysis of water.

In the case where this second reducing agent is carbon monoxide, it may be obtained from any suitable source or prepared in any suitable manner. An acceptable carbon monoxide stream is obtained by the partial oxidation of organic materials, and particularly carbon at high temperature with oxygen, air or steam. Likewise, a carbon monoxide stream suitable for use herein can be prepared by the reduction of carbon dioxide by hydrogen, carbon or certain metals at high temperatures. For example, a gas stream containing about 40% carbon monoxide is easily prepared by blowing steam through a bed of coal at an elevated temperature. Another suitable carbon monoxide-containing stream is obtained by simultaneously blowing air and steam through a bed of red hot coal to produce a gas stream containing about 30% carbon monoxide. In addition, blast furnace gases resulting from the reduction of iron oxide by red hot coke can be utilized to supply the necessary carbon monoxide stream if desired. Yet another source of a suitable carbon monoxide stream is a stream prepared by passing carbon dioxide and oxygen through charcoal or coke at a temperature greater than about 1,000° C. in order to decompose the $CO_2$ to CO. Because it has the highest inherent tendency to produce polysulfide and because it is somewhat more economic, the preferred second reducing agent is carbon monoxide or a stream of reducing gas which is relatively rich in carbon monoxide.

This primary reduction step can be carried out, if desired, without the use of a catalyst; however, in many cases it is advantageous to use a catalyst for this reaction. Based on my investigations I have determined that improved results are obtained in this second step when the reaction zone contains materials such as particles of charcoal, and particles of activated carbon. Particularly good results are obtained with a catalyst comprising a catalytically effective amount of a metallic component, selected from the group consisting of the transition metals and compounds of Groups VI and VIII such as chromium, molybdenum, tungsten, iron, cobalt, nickel, platinum, palladium and compounds thereof. From this, I have concluded that preferred catalysts for the desired reduction reaction comprise a combination of catalytically effective amounts of a Group VI or a Group VIII transition metal component with a suitable porous support such as alumina or activated carbon. Particularly preferred embodiments of the present method involve the use of catalysts in which the metallic component is present in the form of a metallic sulfide. Specifically, a combination of a metallic sulfide selected from the sulfides of the transition metals of Groups VI and VIII of the Periodic Table such as cobalt sulfide, or molybdenum sulfide, or tungsten sulfide combined with a carrier material. The preferred carrier materials are activated carbons such as those commercially available under the trade names of Norite, Nuchar, Darco and other similar products. In addition, other conventional natural or synthetic highly porous inorganic carrier materials may be used as the support for the metallic component such as alumina, silica, silica-alumina, etc. Best results are ordinarily obtained with a catalyst comprising cobalt or molybdenum or tungsten sulfide combined with relatively small particles of activated carbon. Excellent results have been obtained with 10 to 12 mesh activated carbon particles containing about 5 wt. % of cobalt sulfide. In general, the amount of the metallic component utilized in the catalyst should be sufficient to comprise about 0.1 to about 50% or more thereof, calculated on a metallic sulfide basis. These catalysts can be prepared according to any of the conventional procedures for combining a metallic component with a carrier material, with an impregnation procedure with a soluble, decomposable compound of the desired Group VI or VIII metal followed by conventional sulfiding ordinarily giving best results.

This primary reduction step can be carried out in a conventional reaction zone in any suitable manner. The thiosulfatecontaining effluent stream from the preliminary treatment step can be passed into the reaction zone in either upward, radial or downward flow and the second reducing agent can be simultaneously introduced into the reaction zone in either countercurrent or concurrent flow relative to the thiosulfatecontaining effluent stream. Likewise, the sulfide reactant can be added thereto in any conventional manner. In particular, a preferred embodiment of this step involves downward flow of the thiosulfate stream with concurrent flow of a gas stream containing $H_2S$ and the second reducing agent. It is preferred to utilize suitable means in the reaction zone for effecting intimate contact between a liquid stream and a gas stream. Suitable contacting means include bubble trays, baffles and any of the various packing materials known to those skilled in the art. In the preferred case where a catalyst is utilized in this primary reduction step, best results are ordinarily obtained when the catalyst is maintained within the reaction zone as a fixed bed of relatively small particles. These catalyst particles perform the dual functions of catalyzing the desired reaction and of promoting intimate contact between the gas and liquid streams. In the preferred concurrent flow mode of operation for this step, the effluent stream withdrawn from this step typically has both a liquid component and a gas component. The liquid component contains the corresponding polysulfide compound and a minor amount of the corresponding sulfide compound. It is particularly noteworthy that this liquid stream contains only a trace amount of the corresponding sulfate compound. For example, in the case where the input stream to this second step contains ammonium thiosulfate, this aqueous effluent stream will primarily contain ammonium polysulfide with minor amounts of ammonium hydrosulfide, unreacted ammonium thiosulfate, ammonium carbonate and ammonium hydroxide.

The reduction conditions utilized in this primary reduction step are typically relatively more severe than those utilized in the preliminary treatment step and can be generally characterized as reduction conditions sufficient to effect conversion of thiosulfate to polysulfide. The temperature is preferably relatively high and typically selected from the range of about 125° to about 350° C., with best results obtained at a relatively high temperature of about 175° to about 350° C. It is an essential feature of the present invention, that the second step be conducted under liquid phase conditions; accordingly, the pressure employed must be sufficient to maintain at least a portion of the effluent stream from the first step in the liquid phase. Typically the pressure is selected from the range of about 100 to about 3,000 psig., as a function of the reaction temperature in order to be substantially in excess of the pressure required to maintain the desired liquid phase conition. In general, best results are obtained at the relatively high pressure. For example, particularly good results are obtained at a temperature of about 200° C., and a pressure of about 800 psig. It is preferred to use a relatively lower liquid hourly space velocity (defined on the basis of the liquid volume charge rate of the effluent stream from the first step divided by the volume of the reaction zone utilized in this second step in the case where a catalyst is not utilized and by the volume of the catalyst bed in the case where a catalyst is used in this second step). Preferably, this parameter is selected from the range of about 0.1 to about 10 hrs.$^{-1}$, with best results obtained at about 0.1 to about 2 hrs.$^{-1}$. Excellent results have been obtained in this primary reduction step with a LHSV of 1 hrs.$^{-1}$.

Regardless of the exact composition or source of this second reducing agent, it is preferably charged to this primary reduction step in an amount sufficient to provide a mole ratio of reducing agent to thiosulfate compound of about 1:1 to about 10:1, with best results obtained at a mole ratio of about 1.5:1 to about 3:1. In the preferred mode of operation where both the first reducing agent and the sulfide reactant used in the primary reduction step are derived from internal sources, the entire amount of necessary reducing power is supplied to the system by means of this second reducing agent. That is, the only externally derived reducing agent in this preferred mode is the second reducing agent. When the system is lined-out in this latter case, only the net amount of second reducing agent necessary to produce elemental sulfur must be continuously added to the system. For either hydrogen or carbon monoxide as the second reducing agent this stoichiometric amount is 2 moles of reducing agent per mole of sulfite compound contained in the rich absorbent stream. Obviously, when all or a portion of the first reducing agent or of the sulfide reactant utilized in this primary reduction step are obtained from sources external to the present process, this stoichiometric amount is reduced proportionally.

The effluent stream withdrawn from this primary reduction step will contain the corresponding polysulfide compound, minor amounts of a sulfide compound and, in many cases, substantial amounts of unreacted second reducing agent. If the primary reduction step is run so that not all of the second reducing agent is reacted therein, the unreacted second reducing agent may be separated from this effluent stream in an optional separating step before the polysulfide is decomposed. This optional separating step merely involves passing the total effluent from the primary reduction step to a separating zone maintained at conditions sufficient to separate a gaseous phase from a liquid phase. The gaseous phase comprises the unreacted second reducing agent with minor amounts of $H_2S$ and $H_2O$ and this phase can be withdrawn from this zone and recycled to the primary reduction step. The liquid phase from this zone would then contain polysulfide and sulfide compounds and it would be passed to the decomposition step. In the preferred case, substantially all of the second reducing agent is consumed in the primary reduction step and therefrom is passed directly to the polysulfide decomposition step.

After this primary reduction step, a polysulfidecontaining aqueous effluent stream is withdrawn therefrom and at least a portion of it subjected to a polysulfide decomposition step. As previously explained, in one embodiment of the present process, the other portion of this effluent stream is passed to the preliminary treatment step in order to supply the first reducing agent thereto. Any suitable procedure known to the art for decomposing a polysulfide compound can be utilized in this step. One acceptable procedure involves the addition of an acidic material such as carbonic acid, sulfuric acid, hydrochloric acid, nitric acid and the like acids to this effluent stream in an amount sufficient to lower the pH of the solution to a value below 7. Another method involves heating the effluent to a critical temperature in a closed vessel as is shown in U.S. Pat. No. 1,783,725. When the alkaline reagent used is ammonia, a preferred procedure for use in this step involves subjecting the ammonium polysulfide-containing effluent stream to thermal decomposition conditions effective to produce an overhead stream containing hydrogen sulfide and water and a bottoms stream containing ammonium carbonate and/or ammonium hydroxide and elemental sulfur. Suitable ammonium polysulfide decomposition conditions include a temperature of about 100° to 200° C. and a pressure of about 1 to about 75 psig. It is preferred to operate the polysulfidedecomposition step in this thermal decomposition mode so that a relatively low temperature is maintained at the top of the decomposition zone. Ordinarily this objective is conventionally accomplished by using a portion of the bottom water stream from the zone to cool the top of the column and to prevent $NH_3$ carry-over. Excellent results have been obtained in the decomposition of ammonium polysulfide by taking 20 vol. % of the polysulfide-containing effluent stream overhead at a temperature of 140° C. and a pressure of 40 psig. Generally, this step can be conducted in a distillation zone wherein $H_2S$ is stripped from the polysulfide-containing solution with the aid of a suitable upflowing gas stream such as steam, nitrogen, air and carbon dioxide which is typically injected into the bottom of the distillation zone. Of course, upflowing vapors can be generated in the distillation zone by supplying heat to the bottom of same by means such as a steam coil or a conventional reboiler. When the temperature utilized in the bottom of the distillation zone is less than the melting point of sulfur, the elemental sulfur produced in this step will be present in the form of a slurry of solid particles in the aqueous bottom stream withdrawn therefrom. This sulfur-containing aqueous stream can be subjected to any of the techniques known in the art for removing a solid from a liquid such as filtration, settling, centrifuging and the like operation to remove sulfur therefrom and to form the regenerated absorbent stream. On the other hand, when the decomposition temperature utilized in this step is greater than the melting point of sulfur, the bottom stream from the distillation column can be a mixture of liquid sulfur in the regenerated absorbent stream. This mixture can then be passed to a settling zone wherein the liquid sulfur can be allowed to settle and form a separate sulfur phase. In this last case, the separation of liquid sulfur from the treated water stream can be performed, if desired, in the lower region of the distillation column by allowing a liquid sulfur phase to collect at the bottom of the zone and separately drawing it off as a bottom stream. The regenerated absorbent stream is then drawn off as a side stream.

In the case where the stream charged to the polysulfide decomposition step contains a relatively intractable polysulfide compound like sodium polysulfide, the preferred mode of operation of this step involves the use of a stripping gas which is relatively rich in carbon dioxide. Good results are obtained in this mode of operation when the decomposition zone is maintained at a relatively high temperature of about 150° to about 250° C. and at a relatively high pressure of about 500 to about 1,000 psig. The stripping gas is preferably charged thereto in an amount sufficient to provide a mole ratio of carbon dioxide to entering polysulfide of about 1:1 to 10:1 or more. Excellent results are obtained with sodium polysulfide at a temperature of about 200° C., a pressure of about 750 psig., and a mole ratio of $CO_2$ to polysulfide of about 3:1 to 4:1. Regardless of which mode of operation is used in this polysulfide decomposition step, the product streams withdrawn therefrom are: a regenerated absorbent stream, an elemental sulfur stream and an $H_2S$-containing overhead gas stream.

This regenerated aqueous absorbent stream is substantially reduced in total sulfur content relative to the input rich absorbent stream and usually will contain less than 10% of the amount of sulfur contained in the input absorbent stream. In the case where the carbon dioxide is utilized in the polysulfide decomposition step as the stripping medium, this treated water stream will contain substantial amounts of the carbonate or bicarbonate salt of the alkaline reagent originally present in the input absorbent stream — for example in the case where the alkaline reagent is ammonia, the regenerated absorbent stream will contain ammonium carbonate and/or bicarbonate, and in the case where the alkaline reagent is sodium hydroxide or carbonate the treated water stream will contain sodium carbonate and/or bicarbonate.

In accordance with the instant process, at least a portion of the regenerated absorbent stream is passed to the $SO_2$-scrubbing step. In a preferred embodiment of the instant process, a portion of the hydrogen sulfide-containing overhead stream produced in the polysulfide decomposition step are passed to the preliminary treatment step, in order to supply at least a portion of the first reducing agent used therein and to the primary reduction step in order to supply the sulfide reactant used therein. Any remaining portion of this hydrogen sulfide-containing stream can then be recovered as one of the product streams from the instant process if desired. The hydrogen sulfide contained in this product stream can be converted to elemental sulfur by any suitable oxidation procedure such as a conventional Claus process or to sulfuric acid or used per se.

Having broadly characterized the essential steps comprising the present process, reference is now made to the attached drawing for a detailed explanation of a working example of a preferred flow scheme for the present invention. The attached drawing is merely intended as a general representation of the flow scheme involved with no intention to give details about heaters, pumps, valves and the like equipment except where a knowledge of these devices is essential to an understanding of the present invention or would not be selfevident to those skilled in the relevant art.

Referring now to the attached drawing, a flue gas stream enters the system via line 1 and is passed into the lower region of a conventional liquid-gas scrubbing means, zone 2. In this zone it is passed in countercurrent flow to a descending stream of absorbent solution which enters the upper region of zone 2 via line 4. The input gas stream contains about 0.5% $O_2$, 14% $CO_2$, 6% $H_2O$, 79.3% $N_2$ and 0.2% $SO_2$. Zone 2 is a conventional gas-liquid contacting zone fitted with conventional means such as baffles, trays, packing material and the like, for effecting intimate contact between an ascending gas stream and a descending liquid stream. Zone 2 is operated gas-full in order to minimize pressure drop of the gas stream.

Also introduced into zone 2 is a liquid stream comprising the aqueous absorbent solution. It enters zone 2 via line 4 and is made up of two separate streams, one of which is a regenerated absorbent stream obtained from the regeneration section of the present system and the second of which is a major portion of the rich absorbent stream withdrawn from the lower region of zone 2 via line 4. The alkaline reagent contained in this regenerated absorbent stream is primarily sodium carbonate with a minor amount of sodium bicarbonate. The regenerated absorbent is charged to zone 2 in an amount sufficient to provide about 0.7 moles of sodium carbonate per mole of $SO_2$ entering zone 2.

According to the mode of operation of zone 2 shown in the drawing, the rich absorbent stream is withdrawn from the bottom of zone 2 via line 4 and a major portion of this stream is continuously cycled around zone 2 in order to allow the concentration of sulfite salts in the absorbent stream to build to relatively high levels. This procedure increases the capacity of the absorbent and minimizes the amount of the absorbent stream that must by cycled through the regeneration section of the system. The absorbent stream introduced into scrubber 2 via line 4 will accordingly contain a substantial amount of sulfite salts along with the alkaline reagent. Ordinarily, zone 2 is operated by monitoring the pH of the absorbent stream at the inlet to zone 2 and controlling the amount of the rich absorbent stream diverted to the regeneration section of the system at the junction of line 4 and 5 in response to a decrease in pH level. The preferred pH range is about 4 to about 7 or more, with best results ordinarily obtained in the range of about 5 to 7. With the system operating so that the absorbent stream introduced into zone 2 via line 4 is maintained at a pH level within this range, the rich absorbent stream withdrawn continuously from zone 2 via line 4 can typically contain about 1 to about 15 or more wt. % sulfur principally as a mixture of sodium sulfite and sodium bisulfite. In addition, minor amounts of sodium sulfate and thiosulfate are formed in zone 2. In the particular case shown in the drawing, the rich absorbent preferably contains about 10 wt. % sulfur as sodium sulfite and bisulfite.

Zone 2 is operated at a temperature of about 50° C., a pressure of about atmospheric and a gas to absorbent volume ratio of about 200:1. At these conditions, the treated gas stream withdrawn from the upper region of zone 2 via line 3 is found to contain less than 5% of the $SO_2$ originally present in the input gas stream.

As previously explained, the rich absorbent stream withdrawn from the lower region of zone 2 via line 4 is divided into two portions at the junction of line 5 with line 4. The major portion continues on via line 4 and is admixed with regenerated absorbent at the junction of line 18 with line 4. The resulting mixture of cycled and regenerated absorbent is then reintroduced into zone 2 via line 4. The minor portion of the rich absorbent is passed via line 5 into the first reduction zone, zone 6. The amount of rich absorbent passed into zone 6 is ordinarily at least sufficient to remove the net sulfur input into zone 2 from the input gas stream in order to line out the concentration of sulfur in the absorbent stream cycling around zone 2. In the case under consideration, the amount of the rich absorbent withdrawn for regeneration via line 5 will be about 0.1 to 10% of the rich absorbent stream withdrawn from the bottom of zone 2. It is to be noted that during start up of scrubbing zone 2, the inventory of the scrubbing solution needed for initiating operation is introduced into the system via line 20, 18 and 4. It is also to be recognized that there is a net water make in the regeneration of the absorbent which ordinarily is removed from the system in the treated gas stream withdrawn from the system via line 3 if the input water stream has not been presaturated with water, or by removing a portion of the regenerated absorbent via line 19.

The rich absorbent stream introduced into zone 6 via line 5 in the particular case of interest here contains about 10 wt. % sulfur as a mixture of sodium sulfite and sodium bisulfite. It enters the upper region of zone 6 which, once again, is a conventional liquid-gas contacting zone designed to effect intimate contact with an ascending gas stream and a descending liquid stream. Also, introduced into zone 6 via line 16 is a gas stream containing the first reducing agent. More specifically, this gas stream contains hydrogen sulfide and carbon dioxide. During startup of zone 6 sufficient $H_2S$ is introduced thereto via lines 21 and 16 to initiate the desired conversion reaction. Thereafter a portion of the hydrogen sulfide-containing gas stream which is produced in the subsequently described polysulfide decomposition step is passed to zone 6 from zone 14 via line 16. In either case the amount of hydrogen sulfide supplied to zone 6 is sufficient to react about 0.5 moles of $H_2S$ per mole of sodium sulfite plus sodium bisulfite charged to zone 6. By conventional means zone 6 is maintained at a temperature of 50° C. and at a pressure of about 200 psig. Also the flow rates of the stream into zone 6 are adjusted to provide a residence time of the liquid stream in zone 6 of about 0.2 hours.

An overhead gaseous stream comprising substantially pure carbon dioxide is then withdrawn from zone 6 via line 8 and at least a portion thereof passed to polysulfide decomposition zone 14. A portion of this stream may be vented from the system via line 22 in order to remove any inert gases which may be introduced with the second reducing agent via line 9. Likewise, an aqueous effluent stream is withdrawn from the lower region of zone 6 via line 7 and charged to the second reduction zone, zone 11. This aqueous effluent stream contains sodium thiosulfate in an amount corresponding to a conversion in zone 6 of greater than 90% of the input sodium sulfite and bisulfite to sodium thiosulfate. Furthermore, the amount of undesired sodium sulfate formed by the reaction in zone 6 is less than 3% of the input sulfite. Accordingly, the aqueous effluent stream withdrawn from zone 6 via line 7 principally contains sodium thiosulfate with minor amounts of unreacted sodium sulfite and bisulfite and of sodium sulfate.

Although not shown in the attached drawing, the stream flowing through line 7 can be subjected to any suitable procedure for removing sodium sulfate therefrom prior to its passage into zone 11. Since sodium sulfate by-product production is suppressed by the use of the process of the present invention, the amount of sodium sulfate which must be eliminated is ordinarily quite small; however if an exit port for it is not provided it will eventually build-up to the point where the process must be shutdown and recharged with fresh absorbent. Preferred means for eliminating sodium sulfate are either precipitation with calcium hydroxide or fractional crystallization and separation.

Zone 11, the second reaction zone, is another liquidgas reaction zone designed to effect intimate contact between a descending concurrently flowing gas stream and liquid stream. The aqueous effluent stream from zone 6 is introduced into the upper region of zone 11 by means of line 7. Likewise, a gas stream containing the second reducing agent is introduced into the upper region of zone 11 by means of line 9. In accordance with the present invention, an $H_2S$-containing gas stream is also introduced into the upper region of zone 11 via lines 10 and 7. After start-up of the process the source for this last stream is a portion of the overhead from zone 14 which is obtained via lines 16 and 10. During start-up, the source is from line 21 via line 16, 10 and 7. The second reducing agent comprises a mixture of carbon monoxide and hydrogen in a mole ratio of about 1:1. Zone 11 contains a fixed bed of a catalyst comprising 10 to 12 mesh particles of activate carbon having a cobalt sulfide component combined therewith in an amount sufficient to result in a catalyst containing about 5 wt. % cobalt. The amount of second reducing agent introduced into the system via line 9 corresponds to a second reducing agent to sodium thiosulfate mole ratio of about 3:1. The amount of sulfide reactant introduced in zone 11 via line 10 and 7 is sufficient to provide a mole ratio of sulfide to second reducing agent of about 0.3:1. The reduction conditions maintained in zone 11 by conventional means are a temperature of about 200° C., a pressure of about 750 psig. and a liquid hourly space velocity of 1 hr.$^{-1}$.

An aqueous effluent stream containing sodium is then withdrawn from the lower region of zone 11 via line 12 and passed to polysulfide decomposition zone 14. An analysis of the stream flowing through line 12 indicates that 99% of the sodium thiosulfate charged to zone 11 is converted therein to sodium hydrosulfide and sodium polysulfide. Furthermore, 70% of the sodium thiosulfate is converted to sodium polysulfide and 30% to sodium hydrosulfide. Also produced in zone 11 are corresponding amounts of sodium carbonate and sodium bicarbonate. Essentially all of the second reducing agent charged to zone 11 is converted therein to $CO_2$ and $H_2O$ so that the effluent stream from zone 11 is substantially free of second reducing agent. It is to be noted that no substantial amount of sodium sulfate by-product is produced in zone 11.

In polysulfide decomposition zone 14, the aqueous effluent stream from zone 11 is countercurrently contacted with an ascending gaseous stream which essentially comprises at least a portion of the overhead carbon dioxide-rich gaseous stream from zone 6 which is passed thereto by means of line 8. Zone 14 is operated at a relatively high temperature of about 200° C. and at a relatively high pressure of about 750 psig. The stripping gas introduced into zone 14 via line 8 is relatively rich in carbon dioxide. During start-up of the process line 13 is used to charge $CO_2$ to the system until sufficient $CO_2$ becomes available from zone 6. Thereafter, the necessary $CO_2$ for operation of zone 14 is obtained from zone 6 via line 8. The amount of $CO_2$ charged to zone 14 is sufficient to provide a mole ratio of carbon dioxide to entering sulfide of about 3:1 to 4:1. It is, of course, advantageous to use conventional means such as a stream coil or reboiler to heat the liquid in the bottom portion of zone 14 in order to further generate up-flowing vapors which aid in the liberation of $H_2S$.

An overhead gaseous stream is then withdrawn from zone 14 via line 16 and passed to the junction of line 17 with line 16. A first portion of this overhead stream can be withdrawn from the system via line 17 if a sulfide product stream is desired. The gas stream withdrawn via line 17 will then contain the net sulfide product of the present process and, it can be charged to any suitable process for the recovery of sulfur or the manufacture of sulfuric acid if desired; for example, this stream could be passed to a conventional Claus unit for recovery of sulfur via an oxidation procedure. This overhead gaseous stream contains a relatively large amount of hydrogen sulfide and carbon dioxide and minor amounts of water. Typically it comprises about 40% $H_2S$, 40% $CO_2$ and about 10% $H_2O$. A second portion of this overhead stream is then passed via line 16 to zone 6 in order to supply the first reducing agent for the conversion of sulfite to thiosulfate in zone 6. At the junction of line 10 with line 16, a third portion of this overhead stream is passed to zone 11 as previously explained.

The elemental sulfur product of the decomposition reaction occurring in zone 14 collects at the bottom thereof as a separate liquid phase since this zone is run at a temperature above the melting point of sulfur. This sulfur product is drawn off via line 15 in the form of stream of liquid sulfur. On an overall basis, this sulfur product stream represents at least 90% of the sulfur as $SO_2$ absorbed in scrubbing zone 2.

A stream of regenerated absorbent is also withdrawn from the lower region of zone 14 via line 18 as a sidestream. A drag stream of the regenerated absorbent can be withdrawn from the system via line 19 in order to remove sodium sulfate by-product and excess water if necessary. The major portion of this stream is passed back to zone 2 via lines 18 and 4. This regenerated absorbent stream primarily contains a mixture of sodium carbonate and bicarbonate with very minor amounts of unreacted sodium thiosulfate, sodium sulfide, and sodium sulfate. The total sulfur content of this regenerated absorbent stream is less than 10% of the total sulfur content of the rich absorbent stream withdrawn from the scrubbing section of the system via line 5. Moreover, the amount of undesired sodium sulfate formed in the regeneration section of the system (i.e., the section of the system comprising zones 6, 11 and 14) is less than 3% of the sulfite charged to the regeneration section via line 5. Thus the scrubbing process of the present invention enables the continuous scrubbing of $SO_2$ from the gas stream entering the system via line 1 with continuous regeneration and recirculation of absorbent in a closed-loop manner. In addition, the amount of undesired sodium sulfate formed in the regeneration section of the system is held to extremely low levels.

It is intended to cover by the following claims all changes and modifications of the above disclosure of the present invention that would be self-evident to a man of ordinary skill in the gas treating art.

I claim as my invention:

1. A process for treating an input gas stream containing $SO_2$ in order to continuously remove $SO_2$ therefrom and to produce elemental sulfur, said process comprising the steps of:
   a. contacting the input gas stream with an aqueous absorbent stream containing an alkaline reagent at scrubbing conditions selected to produce a treated gas stream containing a reduced amount of $SO_2$ and an effluent water stream containing a water-soluble sulfite compound;
   b. contacting at least a portion of the effluent stream from step (a) with a first reducing agent, selected from the group consisting of finely divided sulfur, a polysulfide compound, a water-soluble sulfide compound and mixtures thereof, at thiosulfate production conditions selected to form a substantially sulfite-free effluent stream containing a thiosulfate compound;
   c. reacting the effluent stream from step (b) with a water-soluble sulfide compound and second reducing agent, selected from the group consisting of carbon monoxide, hydrogen and mixtures thereof, at reduction conditions selected to result in an effluent stream containing a polysulfide compound;
   d. subjecting at least a portion of the effluent stream from step (c) to polysulfide decomposition conditions effective to form elemental sulfur, an $H_2S$-containing overhead stream and a regenerated aqueous absorbent stream; and thereafter;
   e. passing at least a portion of the resulting regenerated aqueous absorbent stream to step (a).

2. A process as defined in claim 2 wherein the alkaline reagent utilized in the absorbent is ammonium carbonate, bicarbonate, hydroxide or sulfite.

3. A process as defined in claim 1 wherein the alkaline reagent utilized in the absorbent is an alkali metal carbonate, bicarbonate, hydroxide or sulfite.

4. A process as defined in claim 3 wherein the alkali metal is sodium.

5. A process as defined as in claim 3 wherein the alkali metal is potassium.

6. A process as defined in claim 1 wherein the alkaline reagent utilized in the absorbent stream is an alkaline earth metal bicarbonate, hydroxide or sulfite.

7. A process as defined in claim 1 wherein the thiosulfate production conditions utilized in step (b) includes a temperature of about 20° to 150° C. and a pressure sufficient to maintain the effluent stream from step (a) in the liquid phase.

8. A process as defined in claim 1 wherein the reduction conditions utilized in step (c) include a temperature of about 125° to about 350° C. and a pressure at least sufficient to maintain the effluent stream from step (b) in the liquid phase.

9. A process as defined in claim 1 wherein the amount of second reducing agent charged to step (c) is sufficient to provide a mole ratio of second reducing agent to thiosulfate compound of at least about 1:1.

10. A process as defined in claim 1 wherein the water-soluble sulfide compound charged to step (c) is hydrogen sulfide and wherein said hydrogen sulfide is obtained by passing a portion of the $H_2S$-containing overhead stream produced in step (d) to step (c) in an amount sufficient to provide a mole ratio of hydrogen sulfide to second reducing agent of about 0.05:1 to about 1:1.

11. A process as defined in claim 1 wherein the first reducing agent is hydrogen sulfide and wherein said hydrogen sulfide is obtained by passing a portion of the $H_2S$-containing overhead stream produced in step (d) to step (b) in an amount corresponding to a mole ratio of hydrogen sulfide to sulfite of at least about 1:2.

12. A process as defined in claim 1 wherein the first reducing agent is finely divided sulfur and wherein the finely divided sulfur is charged to step (b) in an amount sufficient to at least provide a mole ratio of sulfur to sulfite of 1:1.

13. A process as defined in claim 1 wherein the first reducing agent is a polysulfide compound and wherein the polysulfide compound is obtained by passing a portion of the effluent stream from step (c) to step (b) in an amount sufficient to provide a mole ratio of polysulfide to sulfite of about 1:6.

14. A process as defined in claim 1 wherein the first reducing agent is a water-soluble sulfite compound which is passed to step (b) in an amount at least sufficient to provide a mole ratio of sulfide to sulfite of 1:2.

15. A process as defined in claim 1 wherein step (c) is performed in the presence of a catalyst.

16. A process as defined as in claim 15 wherein the catalyst contains activated carbon or charcoal.

17. A process as defined as in claim 15 wherein the catalyst comprises a combination of a catalytically effective amount of a metallic component selected from the group consisting of the transition metals of Groups VI and VIII of the Periodic Table and compounds thereof with a porous carrier material.

18. A process as defined in claim 17 wherein the catalyst comprises a combination of a catlaytically effective amount of cobalt sulfide compound with activated carbon.

19. A process as defined in claim 1 wherein step (d) is performed by contacting the effleunt stream from step (c) with a carbon dioxide-containing gas stream at a pressure of about 500 to 1000 psig. and a temperature of about 150° to about 250° C.

* * * * *